United States Patent [19]

Brockmüller et al.

[11] Patent Number: 5,650,720
[45] Date of Patent: Jul. 22, 1997

[54] ROTATIONAL SPEED-DETECTING DEVICE WITH ROD-SHAPED SENSOR

[75] Inventors: Uwe Brockmüller, Oberwerrn; Achim Müller, Dittelbrunn, both of Germany

[73] Assignee: SKF GmbH, Schweinfurt, Germany

[21] Appl. No.: 552,793

[22] Filed: Nov. 3, 1995

[30] Foreign Application Priority Data

Nov. 18, 1994 [DE] Germany .................. 9418469 U

[51] Int. Cl.⁶ .................................................. G01D 3/44
[52] U.S. Cl. ................................. 324/173; 73/866.5
[58] Field of Search .................. 73/493, 514.39, 73/866.5; 324/173, 174; 310/168

[56] References Cited

U.S. PATENT DOCUMENTS

| | | | |
|---|---|---|---|
| 3,890,517 | 6/1975 | Marsh et al. | 310/168 |
| 4,090,099 | 5/1978 | Daffron | 310/168 |
| 4,858,470 | 8/1989 | Kincaid et al. | 73/493 |

*Primary Examiner*—John E. Chapman
*Attorney, Agent, or Firm*—Eugene E. Renz, Jr.

[57] ABSTRACT

In a device for detecting the rotational speed of a motor vehicle wheel, a sensor and a sensor bracket. The bracket is mounted on a non-rotating part of the vehicle chassis such as an axle journal. The sensor bracket (1) has a tubular socket for the sensor (13) with a locking clip (3), which can be flipped open around a hinge (4), and a latching element (8, 9), which holds the locking clip (3) in a closed position.

6 Claims, 1 Drawing Sheet

ROTATIONAL SPEED-DETECTING DEVICE WITH ROD-SHAPED SENSOR

FIELD OF THE INVENTION

The present invention relates to devices for detecting the rotational speed of a wheel of a motor vehicle and more specifically to improvements in detecting devices of this type.

BACKGROUND OF THE INVENTION

Speed detecting devices for anti-lock braking systems for motor vehicles are not new per se, one such prior design is shown in U.S. Pat. No. 3,890,517. In the axle journals of the motor vehicle. The sensor bracket is mounted by two (2) screws to a bridge welded to the axle journal and has a through hole which is lined with a sleeve made of an elastomeric material. The rod shaped sensor is pressed into this sleeve by means of a special device.

The above design has certain disadvantages and drawbacks. For example, in spite of the relatively simple design of the known device, it is still necessary to have two (2) parts made of different materials. The elastomeric sleeve is a critical component by reason of the strict standards imposed on the sleeve as a result of the temperatures in dirty environmental conditions to which it is exposed. These conditions are especially critical with respect to the sleeve's resistance to aging. Further, because the intrinsic tension enforce of the sleeve alone is responsible for the reliable retention of the sensor, it has been found that the sensor can be displaced when the sleeve undergoes a small amount of fatigue. When this happens, the anti-lock braking system can fail.

In the known arrangement, the sensor is difficult to replace quickly and easily in the event that a defect is present. It has been found that either the sensor must be replaced completely together with the sensor bracket or the defective sensor must be removed and then a new sensor pressed into the sensor bracket by means of the special insertion tool. In both instances, the sensor bracket must first be detached from the mounting bridge.

SUMMARY OF THE INVENTION

With the foregoing in mind, it is an object of the present invention to provide a simpler way of mounting the sensor in a device of the type describe, a mounting which is reliable under harsh conditions for an extended period of time. To this end, in accordance with the present invention, a sensor bracket is provided which is mounted on the non-rotating part of the chassis such as an axle journal, which has a tubular socket for the sensor and a locking clip which can be easily flipped open and includes a latching element which holds the locking clip closed. This arrangement provides certain advantages. For example, it has been found that in a mounting arrangement in accordance with the present invention, the sensor is extremely easy to assemble and disassemble from the sensor bracket without the use of special tools and that the bracket remains undamaged during such operations. Thus, a defective sensor can be replaced quickly and easily. Moreover, the narrow gap required between the head of the sensor and the pulse transmitter which the sensor is designed to scan and which rotates with the wheel of the motor vehicle can be corrected because of the ease with which the sensor can be adjusted. In other words, the present design provides an adjustability feature for fine tuning the sensor position.

In accordance with other features of the invention, the sensor bracket can be made of plastic and can even be made as single unitary piece. Consequently, a very inexpensive, corrosion resistant component is obtained. In accordance with another feature, a metal sleeve may be inserted into the mounting hole of the sensor bracket, for example, by embedding it during the injection molding process which insures that the mounting screw will not come loose later as a result of any possible creep behavior of the plastic.

BRIEF DESCRIPTION OF THE DRAWINGS

These and other objects of the present invention and the various features and details of the operation and construction thereof are hereinafter more fully set forth with reference to the accompanying drawings; wherein.

DETAILED DESCRIPTION OF THE PREFERRED EMBODIMENT

Figure 1:
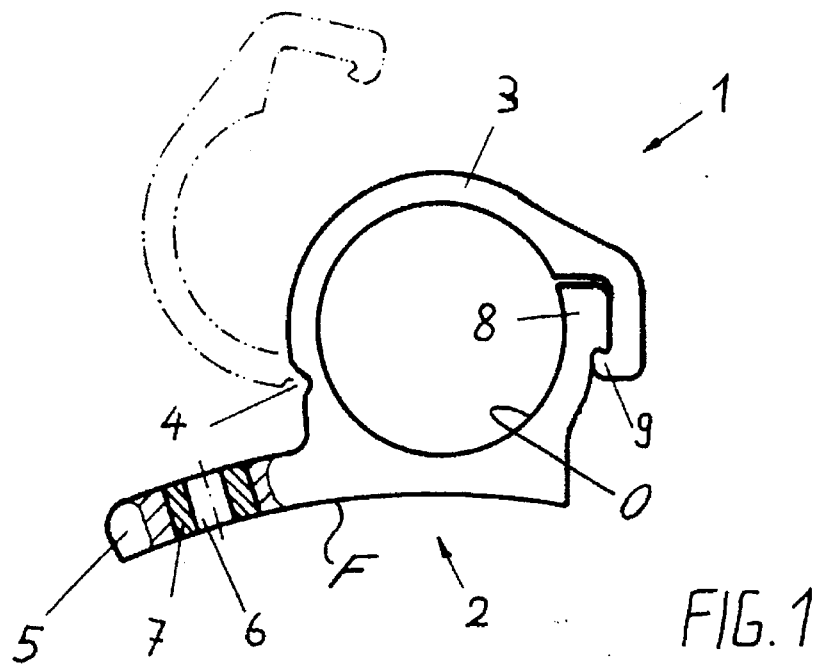
FIG. 1 is a side elevational view partly in section showing a sensor bracket with a locking clip, shown in phanthom lines and an open position.

Referring now to the drawing and particularly FIG. 1 thereof, there is shown a sensor bracket (1) made of a single piece which is preferably made of an elastic grade of plastic consisting of a base part (2) and a locking clip (3) which are connected to each other by a thin walled section which functions as a joint or hinge (4). Base part (2) has an extended foot portion (5) having a polygonally shaped mounting hole (6) for seating a brass sleeve (7) providing a means for mounting the bracket on axle journal (10) via screws (14). Note that the base and foot portion have an arcuate face F providing a flush mount for the bracket on the curved surface of the axle journal (10).

The locking clip (3) is, in the presence instance, formed integrally with the base part (2) and is of generally C-shaped configuration including a projecting catch (9) at its terminal end opposite the hinge (4). The base (2) has a cooperating latching element (8) which nests in a pocket (9a) of the locking clip (3) in the closed position shown in FIG. 1. The inner periphery of the locking clip (3) and base portion (2) including the projection or keeper (8) define a generally cylindrical opening O embracing a tubular sensor when in the locked position as shown in FIG. 2.

Accordingly, when it is a desire to mount a sensor in the bracket (1), or if a sensor which is defective needs replacement and must be removed, the projecting catch (9) of locking clip (3) can be released from keeper (8) whereupon locking clip (3) can be pivoted about hinge (4) to the open position shown in broken lines in FIG. 1. A sensor can then be placed in the arcuate portion of the base and the locking clip pivoted to its closed position and locked by engagement of the catch (9) on the keeper (8).

Figure 2:
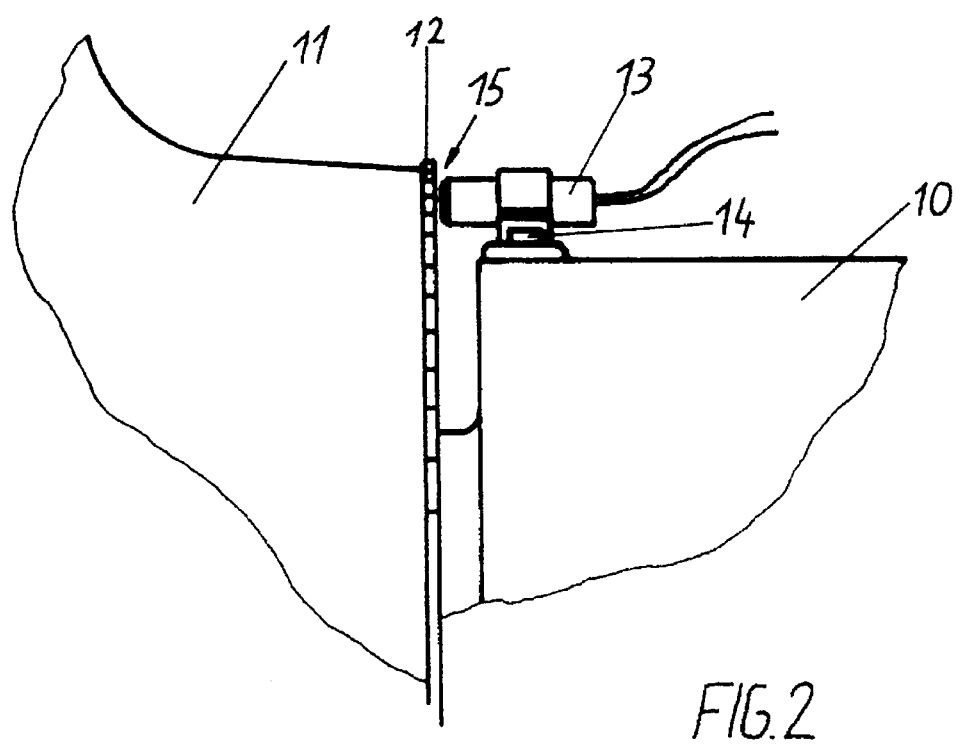
FIG. 2 shows the sensor bracket with a sensor mounted therein.

FIG. 2 shows diagrammatically an axle journal (10) of a motor vehicle which a wheel hub (11) is mounted by means of a roller bearing (not shown). A disk shaped pulse transmitter (12) of thorough magnetic material is connected to the wheel hub (11) and thus rotates around a stationary axle journal (10). The pulse transmitter is equipped with teeth and thus generates pulses in a matter known in itself as the teeth pass by the sensor (13). As noted above, sensor bracket (1) is attached to axle journal by means of a screw (14) and a rod-shaped sensor (13) is inserted into the bracket (1) in the manner described above. As can be seen from FIG. 2, it is easy to provide a very narrow air gap (15) at the inner phase between the sensor and pulse transmitter (12) which is required for the sensor to generate a high output signal by selective positioning of the sensor (3) in the bracket (1). The mounting arrangement provides for easy axial adjustment in the bracket.

Even though a particular embodiment of the present invention has been illustrated and described herein, it is not intended to limit the invention and changes and modifications may be made therein within the scope of the following claims.

What is claimed is:

1. Device for detecting the rotational speed of a motor vehicle wheel including a sensor and a sensor bracket mountable on a non-rotating part of the vehicle chassis, characterized in that the sensor bracket (1) has a tubular socket for the sensor (13) with a locking clip (3), which can be pivoted to an open position around a hinge (4), and a latching element (8, 9), which holds the locking clip (3) closed.

2. Device according to claim 1, characterized in that the sensor bracket (1) is made of an elastic grade of plastic.

3. Device according to claim 2, characterized in that the sensor bracket (1) is designed as a single piece of material with a thinner area forming the hinge (4) and with a projecting catch (9) at the free end of the locking clip (3), this catch gripping behind a projection (8) on the base part (2) of the sensor bracket (1) when the locking clip (3) is closed.

4. Device according to claim 2 characterized in that the sensor bracket (1) has at least one mounting hole (6), into which a metal sleeve (7) is inserted.

5. Device accordingly to claim 1 wherein said non-rotating part of the vehicle chassis comprises an axle journal.

6. Device for detecting the rotational speed of a motor vehicle wheel including a sensor and a sensor bracket mountable on a non-rotating part of the vehicle chassis, characterized in that the sensor bracket (1) has a socket for enclosing the sensor, a locking clip (3) pivotal to an open position around a hinge (4), and a latching element (8, 9) for holding the locking clip (3) in a closed position.

* * * * *